United States Patent
Zimlich, III

[11] Patent Number: 6,132,788
[45] Date of Patent: *Oct. 17, 2000

[54] OAK AGED ALCOHOLIC BEVERAGE EXTRACT

[75] Inventor: Joseph A. Zimlich, III, Louisville, Ky.

[73] Assignee: Brown-Forman Corporation, Louisville, Ky.

[ * ] Notice: This patent issued on a continued prosecution application filed under 37 CFR 1.53(d), and is subject to the twenty year patent term provisions of 35 U.S.C. 154(a)(2).

[21] Appl. No.: 08/505,457

[22] Filed: Jul. 21, 1995

[51] Int. Cl.$^7$ ............................... C12G 3/07; C12G 3/08
[52] U.S. Cl. ..................... 426/424; 426/387; 426/427; 426/429; 426/490
[58] Field of Search ................... 426/330.4, 424, 426/429, 490, 592, 590, 655, 386, 387, 427

[56] References Cited

U.S. PATENT DOCUMENTS

| | | |
|---|---|---|
| 92,640 | 7/1869 | Parsons . |
| 161,642 | 4/1875 | Spier . |
| 818,478 | 4/1906 | Schwayder . |
| 1,264,564 | 4/1918 | Russell ................................. 426/387 |
| 1,265,838 | 5/1918 | von Glahn . |
| 1,908,407 | 5/1933 | Coupeau et al. ..................... 426/387 |
| 1,976,091 | 10/1934 | Pritchett . |
| 1,981,873 | 11/1934 | Miller ................................. 426/520 |
| 2,027,099 | 1/1936 | Hochwalt et al. . |
| 2,055,060 | 9/1936 | Barker . |
| 2,070,794 | 2/1937 | Krebs et al. . |
| 2,086,080 | 7/1937 | Herrick . |
| 2,092,866 | 9/1937 | Wisniewski . |
| 2,132,435 | 10/1938 | Reiman . |
| 2,145,243 | 1/1939 | Bagby . |
| 2,807,547 | 9/1957 | Nickol . |
| 2,859,117 | 11/1958 | Braus et al. . |
| 2,991,180 | 7/1961 | Faure ................................. 426/592 |

(List continued on next page.)

FOREIGN PATENT DOCUMENTS

| | | |
|---|---|---|
| 83064 | 1/1977 | Australia . |
| 62799A1 | 10/1982 | European Pat. Off. . |
| 0 634 108 | 1/1995 | European Pat. Off. . |
| 0634108A2 | 1/1995 | European Pat. Off. . |
| 3024055 | 1/1982 | Germany . |
| 1-157372 | 6/1989 | Japan . |
| 1165365 | 6/1989 | Japan . |
| 122122 | 10/1958 | U.S.S.R. . |
| 215185 | 4/1968 | U.S.S.R. . |
| 891770 | 12/1981 | U.S.S.R. . |
| 1196373 | 12/1985 | U.S.S.R. . |
| 1663022 | 7/1991 | U.S.S.R. . |
| 6770 | 10/1906 | United Kingdom . |
| 500081 | 2/1939 | United Kingdom . |
| 2027447 | 7/1978 | United Kingdom . |

OTHER PUBLICATIONS

Ch. Abstract 3582h of M.B. Jacobs "Oxidative Aging of Whisky", *Am. Perfumer* 49, 263–5 (1947).

Ch. Abstract 6082e of H. Aich, "Ripening of alcoholic beverages, expecially of brandies", Hung. 135,672, (1949).

Ch. Abstract 11782e of V. Zigori, "Acellerated aging of brandies for production of natural brandy," *Bul. Shkencave Natyr., Univ. Sheteteror Tiranes* 27(12), 97–109 (Albanian) (1973).

(List continued on next page.)

*Primary Examiner*—Curtis E Sherrer
*Attorney, Agent, or Firm*—McDermott, Will & Emery

[57] ABSTRACT

An extract of a mature oak aged alcoholic beverage is produced by adding a food grade solvent, such as ethyl acetate, to the alcoholic beverage and mixing the two liquids. The resulting mixture is allowed to separate into two layers, a first layer and a second layer. The first layer, including the food grade solvent, is separated from the second layer. The solvent is then removed from the first layer to produce the extract. The extract can be added to a less costly alcoholic beverage, such as grain neutral spirits, or sugar beet spirits, to produce a beverage having the taste of a mature oak aged alcoholic beverage.

19 Claims, 1 Drawing Sheet

WHISKY CONCENTRATE PROCESS

U.S. PATENT DOCUMENTS

| | | |
|---|---|---|
| 3,843,809 | 10/1974 | Luck . |
| 4,069,351 | 1/1978 | Yano et al. . |
| 4,499,117 | 2/1985 | Bonneau . |
| 4,778,688 | 10/1988 | Matson . |
| 4,877,635 | 10/1989 | Todd, Jr. . |
| 4,990,350 | 2/1991 | Rohmann . |
| 5,034,238 | 7/1991 | Seidlite et al. ............... 426/330.4 |
| 5,356,641 | 10/1994 | Bowen et al. . |

OTHER PUBLICATIONS

Ch. Abstract 84475n of J. Tamchyna, "Continuous artificial maturing of spirits," Czech. 150,340 (Cl. C 12h), Sep. 15, 1973, App. 643/71, Jan. 29, 1971; 3 pp. Addn. to Czech. 146,438 (CA 78:122663z).

Ch. Abstract 39129r of E. L. Mndzhoyan, "New way of treating oak for brandy production," *Dokl. Akad. Nauk Arm. SSR* 1977, 65(1), 46–51 (Russ).

Ch. Abstract 134870j of E. L. Mndzhoyan, "Brandy spirit aging accelerant made from oakwood," U.S.S.R. 591,504 (Cl. C12H1/22), Feb. 5, 1978, App. 2,313,536, Jan. 9, 1976, *Otkrytiya, Izobret., Prom. Obraztsy, Tovarnye Znaki,* 1978, 55(5), 3.

Ch. Abstract 22256c of E. L. Mndzhoyan, "Treatment of oak wood for brandy production," *Vinodol. Vinograd. SSSR* 1978, (1), 15–18 (Russ).

Ch. Abstract 85216f of J. Tamchyna, "Accelerated aging of distillates," *Kvasny Prum.* 1978, 24(10), 232–4 (Slo).

Ch. Astract 130515c of A. Popa, "Increased use of noncommercial grape production by rapidly ageing wine distillates," *An. Univ. Craiova, [Ser]: Biol., Agron., Hortic.* 1977, 8(18), 169–75 (Rom.).

Ch. Abstract 141204p of Kliman et al., "Artificial aging of alcoholic drinks," (Cl. C12H1/12), Sep. 30, 1981, Appl. 76/5,055, Aug. 03, 1976; 4 pp.

Ch. Abstract 32980j of Semenenko et al., "Improvement of the brandy maturing process," *Sadovod. Vinograd. Vinodel. Mold.* 1982, 37(10), 20–31 (Russ).

Ch. Abstract 36109b of J. A. Maga, "Flavor contribution of wood in alcoholic beverages," *Dev. Food Sci.* 1985, 10(Prog. Flavour Res.), 409–16 (Eng.).

Ch. Abstract 224604z of Gubiev et al., "Accelerated aging of distilled alcoholic beverages," Fr. Demande FR 2,570,080 (Ct. C12H1/22), Mar. 14, 1986, Appl. 84/13802, Sep. 07, 1984; 11 pages.

Ch. Abstract 152875e of Lyubchenkov et al., "Enrichment of brandy spirits with extractive substances of oak wood in a continuous flow system," *Otkrytiya, Izobret.* 1987, (7), 122.

Ch. Abstract 234741x of Vazquez et al., "Accelerated aging of rums," *Sobre Deriv. Cana Azucar,* 1987, 21(1), 19–22 (Span).

Ch. Abstract 230106h of V. Lichev, "Influence of oxidation processes on the development of the taste and flavor of wine distillates," *Am. J. Enol. Vitic.,* 1989, 40(1) 31–(Eng.).

Ch. Abstract 230685s of Mndzhoyan et al., "Method of producing from oakwood an accelerating agent for maturing brandy spirits," U.S.S.R. SU 1,472,489 (Cl. C12H1/22), Apr. 15, 1989, Appl. 4,183,861, Jan. 21, 1987, *Otkrytiya, Izobret,* 1989 (14), 115.

Ch. Abstract 80026y of Chatonnet et al., Effect of heat on oak wood and its chemical composition. Part 2. Variations of certain compounds in relation to burning intensity. *Connaiss. Vigne Vin,* 1989, 23(4), 223–50 (Fr).

Ch. Abstract 62234m of Lipis et al., "Extraction of volatile substances from liquid foods of vegetable origin," Tr. Mold. *Nauch.–Issled. Inst. Pishch. Prom.,* 1970, No. 10, 38–44 (Russ).

Ch. Abstract 127764v of C. Jarraud, "Extract for improvement and aging of spirits," Fr. Demande 2,356,722 (Cl. C12G3/00), Jan. 27, 1978, Appl. 76/20,162, Jul. 01, 1976; 6 pages.

Ch. Abstract 101953b of R. Leaute, "Substance for use in the manufacture or subsequent treatment of alcoholic liquids," *Ger. Offen.* 2,829,964 (Cl. C12G3/06), Jan. 25, 1979, Lux Appl. 77,707, Jul. 07, 1977; 19 pages.

Ch. Abstract 196771x of Marinov et al., "Lignin in oak wood, brandy distillate, and oak extract," *Nauchni Tr., Vissh Inst. Khranit. Vkusova Prom–st., Plovdiv,* 1980 (Pub. 1981), 27(2), 55–66 (Bulg).

Ch. Abstract 20865h of Bozhinov et al., "Oak extract in the aging of wine distillates," *Lozar. Vinar.,* 1983, 32(2), 21–4 (Bulg.).

Ch. Abstract 73802w of Ackermann et al., "Simplified method for imparting smoky flavor to alcoholic beverages," Ger. (East) DD 245,900 (Cl. C12G3/06), May 20, 1987, Appl. 286,396, Jan. 22, 1986; 2 pages.

Ch. Abstract 40138w of Sato et al., "Preparation of condensed wine to be used for cooking," Jpn. Kokai Tokkyo Koho JP 03,240,462 [91,240,462] (Cl. A23L1/23), Oct. 25, 1991, Appl. 90–37,351, Feb. 20, 1990; 7 pages.

Ch. Abstract 254018j of Pino et al., "Comparison of extraction methods for the isolation of volatile compounds from distilled alcoholic beverages," *Nahrung,* 1994, 38(3), 307–10 (Eng.).

Ch. Abstract 264124a of Langguth et al., "Composition and production of alcoholic beverages with brandy–like flavor," Ger. Offen. DE 4,331,437 (Cl. C12G3/04), Mar. 23, 1995, Appl. Sep. 13, 1993, 3 pages.

H.J. Grossman, Grossman's Guide to Wines, Beers, and Spirits, 6th Ed., Charles Scribner's Sons, New York, 1977, pp. 311–320.

Concise Encyclopedia Chemistry, Walter de Gruyter, Berlin, New York, 1994 pp. 777–778.

OAK AGED ALCOHOLIC BEVERAGE EXTRACT

BACKGROUND OF THE INVENTION

1. Field of the Invention

The invention is directed to a process for producing an extract of a mature oak aged alcoholic beverage and to the product of such a process.

2. Discussion of Related Art

Typically, the production of mature oak aged alcoholic beverages, such as whisky, bourbon, rum or tequila, includes the steps of fermentation, distillation, e.g., in a still, and then aging in oak barrels for a suitable period of time, e.g., 3 to 8 years or longer.

When mature oak aged alcoholic beverages are exported to foreign countries, substantial transportation costs are incurred because of the cost of transporting 40–50% of water and 40–45% ethanol. Furthermore, substantial excise tax is also paid for the exportation of such alcoholic beverages due to their high alcoholic content.

Attempts have been made in the past to address some of the above problems. It has been attempted to produce, from less expensive alcoholic beverages, alcoholic beverages of superior taste, simulating that of mature oak aged alcoholic beverages. For example, several whisky flavors have been available on the market, offered by several flavor companies. These flavors contain natural and synthetic flavors which are then added back to a relatively inexpensive whiskey to enhance the flavor thereof. However, such flavors, generally speaking, fall short of being able to provide to a relatively inexpensive whiskey or spirit the flavor characteristics of a mature oak aged alcoholic beverage.

A need, therefore, still exists for an extract of an oak aged alcoholic beverage which can be added to a less expensive alcoholic beverage, such as grain neutral spirits or cane neutral spirits, to produce an alcoholic beverage having substantially the same taste characteristics as the oak aged alcoholic beverage.

SUMMARY OF THE INVENTION

It is an object of the present invention to provide an extract made from a mature oak aged alcoholic beverage which can be added to a less costly alcoholic beverage (than the mature oak aged alcoholic beverage) to produce an alcoholic beverage having substantially the same flavor as the mature oak aged alcoholic beverage. The less costly alcoholic beverage can be grain neutral spirits, sugar beet spirits, sugar cane spirits, or similar beverages.

One embodiment of the invention is directed to a process of producing an extract of a mature oak aged alcoholic beverage. This process comprises adding a food grade solvent to the alcoholic beverage and mixing, preferably thoroughly mixing, to produce a mixture of the solvent and the alcoholic beverage. Subsequently, a first layer comprising the food grade solvent is allowed to separate from a second layer. Then, the first layer is substantially separated from the second layer, and the food grade solvent is substantially removed from the first layer to produce the extract.

Another embodiment of the invention is directed to an extract of a mature oak aged alcoholic beverage produced by a process of the invention. The extract is produced by adding a food grade solvent to the mature oak aged alcoholic beverage and mixing, preferably thoroughly mixing, to produce a mixture of the solvent and the alcoholic beverage. Subsequently, a first layer comprising the food grade solvent is allowed to separate from a second layer. In the next step, a first layer is substantially separated from the second layer. Finally, the food grade solvent is substantially removed from the first layer to produce the extract.

The process and product of the invention provide significant advantages. The extract has substantially cheaper transportation costs than the mature oak aged alcoholic beverage. Furthermore, the extract is not likely to be subjected to excessive excise taxes normally charged upon importation of oak aged alcoholic beverages. As a result, the extract can be economically imported into many different foreign countries where it can be added to the specific country's predominant spirit, to produce alcoholic beverages having substantially the same taste characteristics as the mature oak aged alcoholic beverages.

DESCRIPTION OF PREFERRED EMBODIMENTS

Figure 1:
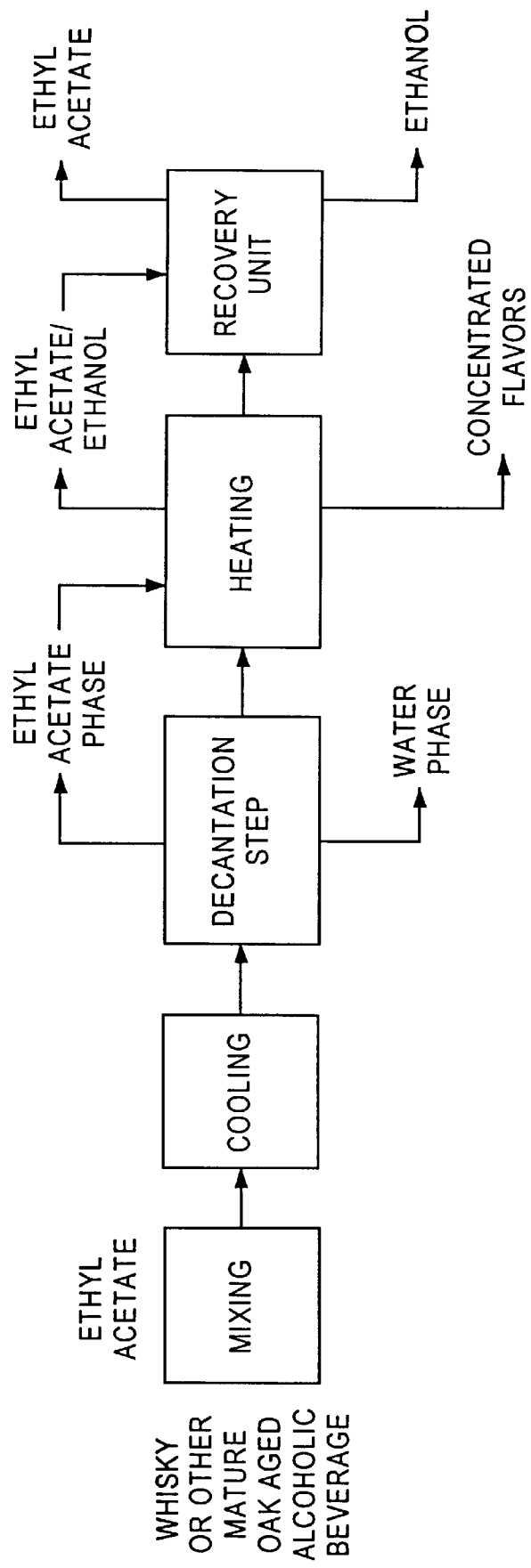
FIG. 1 is a schematic representation of the process of the invention.

The term "mature oak aged alcoholic beverage" designates any oak aged alcoholic beverage which has aged in the presence of oak, e.g., in oak wood barrels, and matured, as defined by an expert taste panel. Examples of such mature oak aged alcoholic beverages include bourbon, scotch, whisky, rum, tequila, and oak aged wines, such as cabernet, and chardonnay.

The term "mature oak aged alcoholic beverage" also includes an alcoholic beverage produced by an accelerated whisky maturation method. This method is intended to provide, at a relatively low cost, an alcoholic beverage having substantially the same taste characteristics as mature oak aged alcoholic beverages produced by traditional aging methods, including aging of a beverage, such as a whisky aged in oak barrels. In the accelerated whisky maturation method any high proof alcoholic distillate is used. The terms "high proof alcoholic distillate" or "alcoholic distillate" designate a distillate produced from a distillation apparatus, such as a still, which has not been aged in the presence of oak wood. An example of a suitable high proof alcoholic distillate is a whisky distillate. The proof range of the alcoholic distillate is about 40 to about 195 proof, preferably about 100 to about 120 proof. In this method, the alcoholic distillate is combined with toasted wood chips, typically toasted oak chips, and the resulting mixture is heated and oxygenated for a period of about 5–about 40 days, preferably about 9–about 14 days or the time required to give color and flavor of a mature alcoholic beverage product aged in oak barrels. The flavor of the resulting alcoholic beverage closely resembles that of the mature whisky which has been aged in a conventional manner for about 36 months or longer. The relative proportion of the toasted wood chips added to the alcoholic distillate is about 15–about 500 grams per liter of the alcoholic distillate. The temperature to which the mixture of the wood chips and the alcoholic distillate is heated is about 40–about 85° C., preferably about 50–about 60° C., and most preferably about 60° C., and the oxygenation is conducted to maintain a level of at least about 10 milligrams per liter of dissolved oxygen, up to the point where the alcoholic distillate is saturated with oxygen. In one embodiment, the alcoholic distillate contains about 25 milligrams per liter of dissolved oxygen. The amount of oxygen may be adjusted to lower or higher levels.

The food grade solvent is any solvent which is suitable and approved for use in conjunction with foods intended for human consumption. Examples of suitable solvents are ethyl acetate, liquid carbon dioxide, hexane and one or more components of fusel oil, preferably ethyl acetate. The term "fusel oil" designates a liquid obtained in small amounts as a by-product of alcoholic fermentation, that consists of a mixture chiefly of alcohols, such as isopentyl, active amyl, isobutyl and normal propyl alcohols. The term "less costly alcoholic beverage" means any alcoholic beverage suitable for human consumption which has not been aged, and includes such beverages as the grain neutral spirits, sugar beet spirits, sugar cane spirits and similar beverages.

The term "substantially removed", as used in describing the removal of the food grade solvent from the first layer, means that substantially all of the solvent is removed, although some insignificant, trace amounts of the solvent might still remain.

In the initial step of the process, the food grade solvent is added to the mature oak aged alcoholic beverage in the proportion of about 1:1–about 5:1, preferably about 1:1–1.5:1 by volume. The two liquids are mixed, preferably thoroughly mixed, e.g., stirred on a stirplate. The food grade solvent and the mature oak aged alcoholic beverage are mixed, preferably thoroughly mixed, so that the two liquids come into close, and preferably intimate, contact between substantially the entire volumes of both liquids. The mixing can be carried out by any means to provide such a contact, e.g., agitation, high speed dispersion or homogenization.

The mixture is then stored at a temperature of about 15–about 85° F., preferably about 30–about 75° F. for about 1–about 48 hours, preferably about 1–20 hours. After the storage, the mixture separates into a first layer and a second layer. The first layer, which is usually the top layer, comprises the food grade solvent with flavors, color and ethanol. The flavors include the fusel oil, oak lactones, tannins, color, vanillin, esters and aldehydes which are in the ethyl acetate phase if the latter is used as the solvent. The second layer, usually the bottom phase, is mainly water and some alcohol and it may have minute quantities of these original flavor compounds. The first layer is then substantially separated from the second layer by any suitable known method, such as decantation or centrifugation. The food grade solvent is removed from the first layer by any known methods of removing a solvent from a liquid. Suitable methods include removing the solvent by evaporation, distillation, vacuum distillation, flash evaporation and thin film evaporation. Preferably, the food grade solvent, such as ethyl acetate is removed by evaporation under vacuum at 60° C. This can be done using any known technique for distillation or vacuum distillation. The removal of the food grade solvent from the first layer produces the extract.

To produce an alcoholic beverage using the extract, the extract is added to any one or a combination of the aforementioned less costly alcoholic beverages. The amount of the extract used is about 1 to about 5%, preferably about 2 to about 5% by weight. The extract can be used in an amount which would produce an alcoholic beverage product for human consumption most suitable for each individual country's taste and preference.

As described in detail in the examples, when the extract was added to grain neutral spirits, the product was evaluated by a taste panel to be very similar to a 48-month old Jack Daniels® whisky.

The following examples further illustrate the invention. It will be understood, however, that the examples are presented merely for the sake of illustration and not limitation of the scope of the invention.

EXAMPLE 1

PURPOSE:

To extract whisky flavors from Jack Daniels® whisky (abbreviated as "JD") using organic solvent extraction. This technology was also applied to wood soak material, also referred to herein as oxygenated wood soak material (produced by the accelerated whisky maturation method) to achieve a low cost flavor extraction of vital whisky characteristic compounds.

METHODS AND MATERIALS:

Materials 200 g/L of 14 day oxygenated wood soak

JD at 82 proof

Ethyl Acetate>99% purity

Methods a.) EXPERIMENT #1

This experiment involved comparing 82 proof JD extraction characteristics with those of the wood soak material.

1. Weigh out 380 g each of JD and wood soak material into 2 liter beakers.
2. Add 380 g of Ethyl Acetate to each. Cover tightly with foil.
3. Stir for 30 minutes on a Corning® stirplate at #5 setting.
4. Transfer each to a 1000 ml beaker. Store at 20 degree Fahrenheit overnight.
5. Pull off the top solvent layer as well as possible using decantation and pipets. Collect the top and bottom layers to submit for analysis. Record weights and results in the following table.

Data for experiment #1: {Reported in ppm}

| Sample | Phase | Gallic Acid | HMF[a] | Furfural | Syr Ald[b] | Vanillin | Syr Acid[c] | Ell Acid[d] | Weight(g) |
|---|---|---|---|---|---|---|---|---|---|
| 1 | Top JD | 5.2 | 2.1 | 6.7 | 2.3 | 2.3 | 8.4 | 20.4 | 440 |
|   | Bottom JD | 2.0 | 1.1 | 1.3 | 0.8 | 0.6 | 2.9 | 6.3 | 295 |
| 2 | Top wood soak (WS) | 22.0 | 14.0 | 35.4 | 26.4 | 28.0 | 83.2 | 148 | 465 |
|   | Bottom WS | 6.3 | 7.7 | 8.5 | 6.9 | 4.6 | 27.5 | 21.9 | 220 |
|   | Middle WS | 10.5 | 10.7 | 22.6 | 16.7 | 15.7 | 54.8 | 77.7 | 55 |

[a]HMF = 5 (hydroxy methyl) 2 - furaldehyde
[b]Syr Ald = syring aldehyde
[c]Syr Acid = syringic acid
[d]Ell Acid = ellagic adid
NOTE: The emulsion layer in this experiment was due to the elongated stirring time, the cold temperature during the extraction and possibly poor separation due to recovery from a graduated cylinder. Later studies use separatory funnels.

EXAMPLE 2

EXPERIMENT #2

This example involved using the solvent layer from the wood soak extraction above (top layer) to make a whiskey flavor concentrate.

Sample #2 was concentrated by heating on a combination stir/hot plate until most of the ethyl acetate appeared to have been removed. In the initial studies, the solvent was simply evaporated atmospherically under a ventilation hood. The experiment started with approximately 275 g of material and it was concentrated to a volume of approximately 40 ml (40 g). This extract (or concentrated essence) was used in the following reconstitution in order to create a whiskey/bourbon.

To prepare the alcoholic beverage product, the following was used:

To 1 liter 80 proof of grain neutral spirits (GNS), 5% wt/wt of the concentrated essence was added. Next, 1 ml/L of an aldehyde essence prepared from a JD distillation was added (to provide flavor topnotes).

500 ml of the above material was split off to carbon treat it. 0.3 g/L of activated carbon from American Norit Co., Inc., PCBG Norit, was used for the treatment. This was stirred for 1 hour and allowed to settle overnight. The material was filtered through a 755 grade filter pad to produce a carbon-treated sample #3.

The carbon-treated sample #3 was evaluated by a whisky taste panel and was deemed acceptable as an Early Times® whiskey/bourbon.

EXAMPLE 3

This Example was used to arrive at parameters to use for optimum extractions. The main idea was to examine two temperatures (20° F. and room temperature), three solvent to whiskey ratios (1:1, 1.25:1, & 1.5:1.) (0.25:1 and 0.5:1 were eliminated due to little or no partitioning ability), and three partitioning times (2,6,20 hour)

1. 300 g of JD whiskey was weighed out into 1000 ml cylinders. The 2 hour study used the 82 proof while the other two used 86 proof. Controls were submitted for each.
2. The contents of the cylinders were poured into 1000 ml glass separatory funnels. (2000 ml funnels had to be used for the 1.5:1 ratio study)
3. Ethyl acetate was weighed out into appropriate amounts, per ratio, and added to the separatory funnels.
4. The funnels were shaken for 3–5 minutes, vented after 30 seconds, to allow for sufficient mixing.
5. The funnels were allowed to set according to the proper time and temperature.
6. The top and bottom layers were decanted, weighed and submitted to analytical for discovery and tannin analysis.

The following three tables give the amount of compounds extracted as well as the weights of the extraction layers.

| | 2 HOUR EXTRACTION | | | | | | | | |
|---|---|---|---|---|---|---|---|---|---|
| SAMPLE | GALLIC ACID | HMF | FURFURAL | SYRINGIC ACID | VANILLIN | SYR. ALDEH. | ELL. ACID | TANNINS | |
| 1. PPM | | | | | | | | | |
| 1:1 TOP RT | 3 | 1.8 | 4.9 | 1.6 | 1.4 | 6.2 | 9 | 193 | |
| 1:1 BOTTOM RT | 2.7 | 1.5 | 2.6 | 1.1 | 0.8 | 3.6 | 5.4 | 141 | |
| 1.25:1 TOP RT | 3.4 | 1.7 | 4.9 | 1.7 | 1.6 | 6.1 | 8.7 | 192 | |
| 1.25:1 BOTTOM RT | 2.4 | 1.3 | 1.7 | 0.8 | ND | 2.5 | 3.4 | 150 | |
| 1.5:1 TOP RT | 2.6 | 1.5 | 4.3 | 1.5 | 1.4 | 5.9 | 6.3 | 145 | |
| 1.5:1 BOTTOM RT | 2.4 | 1.1 | 1.4 | 0.6 | ND | 2.6 | 3.3 | 139 | |
| 1:1 TOP COLD | 3.5 | 1.8 | 5.9 | 1.7 | 1.7 | 7.2 | 9.2 | 221 | |
| 1:1 BOTTOM COLD | 2.2 | 1.4 | 1.8 | 0.7 | 0.5 | 2.6 | 3.1 | 125 | |
| 1.25:1 TOP COLD | 3.2 | 1.8 | 5.3 | 1.9 | 1.7 | 6.5 | 8.7 | 213 | |
| 1.25:1 BOTTOM COLD | 2 | 1.2 | 1.4 | 0.7 | 0.5 | 2.8 | 2 | 136 | |
| 1.5:1 TOP COLD | 2.5 | 1.5 | 4.4 | 1.2 | 1.5 | 5.6 | 5.6 | 161 | |
| 1.5:1 BOTTOM COLD | 1.6 | 0.9 | 0.9 | 0.4 | ND | 1.6 | 1.7 | 115 | |
| 1.5:1 MIDDLE COLD | 2.6 | 1.5 | 4.2 | 1.4 | 1.3 | 5 | 5.2 | 169 | |
| JD 82 PROOF CONTROL | 7.2 | 3.6 | 9.1 | 3.7 | 3.3 | 13.1 | 15.5 | 448 | |
| 2. WEIGHT YIELD (G) | | | | | | | | | |
| | GALLIC ACID | HMF | FURFURAL | SYRINGIC ACID | VANILLIN | SYR. ALDEH. | ELL. ACID | TANNINS | START WT (g) | FIN. WT. |
| 1:1 TOP RT | 0.00116 | 0.00069 | 0.0019 | 0.000616 | 0.000539 | 0.00239 | 0.00347 | 0.074 | 300 | 385 |
| 1:1 BOTTOM RT | 0.00054 | 0.0003 | 0.00052 | 0.000022 | 0.00016 | 0.00072 | 0.0011 | 0.028 | 300 | 200 |
| 1.25:1 TOP RT | 0.00168 | 0.00084 | 0.00243 | 0.000842 | 0.000792 | 0.00302 | 0.00431 | 0.095 | 375 | 495 |
| 1.25:1 BOTTOM RT | 0.00042 | 0.00023 | 0.000298 | 0.00014 | 0 | 0.000438 | 0.000595 | 0.026 | 300 | 175 |
| 1.5:1 TOP RT | 0.0015 | 0.00086 | 0.00247 | 0.000863 | 0.000805 | 0.00339 | 0.0036 | 0.083 | 450 | 575 |
| 1.5:1 BOTTOM RT | 0.00046 | 0.00021 | 0.00027 | 0.000114 | 0 | 0.000494 | 0.00063 | 0.026 | 300 | 190 |
| 1:1 TOP COLD | 0.00124 | 0.00064 | 0.00209 | 0.000604 | 0.000604 | 0.0256 | 0.0033 | 0.078 | 300 | 355 |
| 1:1 BOTTOM COLD | 0.00054 | 0.00034 | 0.000441 | 0.000172 | 0.000123 | 0.0064 | 0.0076 | 0.031 | 300 | 245 |
| 1.25:1 TOP COLD | 0.0015 | 0.00085 | 0.0025 | 0.00089 | 0.0008 | 0.00306 | 0.00409 | 0.1 | 375 | 470 |
| 1.25:1 BOTTOM COLD | 0.00043 | 0.00026 | 0.000301 | 0.000151 | 0.000108 | 0.000602 | 0.00043 | 0.0292 | 300 | 215 |
| 1.5:1 TOP COLD | 0.00129 | 0.00077 | 0.00227 | 0.000618 | 0.000773 | 0.00288 | 0.002884 | 0.083 | 450 | 420 |
| 1.5:1 BOTTOM COLD | 0.000336 | 0.000019 | 0.00019 | 0.000084 | 0 | 0.000336 | 0.00036 | 0.0242 | 300 | 210 |
| JD 82 PROOF CONTROL | 0.00216 | 0.0011 | 0.00273 | 0.00111 | 0.00099 | 0.00393 | 0.00465 | 0.1344 | 0 | 95 |
| | | | | | | | | | N/A | N/A |
| 1. PPM | | | | | | | | | |
| 1:1 TOP RT | 3.2 | 1.8 | 5.4 | 1.5 | 1.4 | 5.8 | 4.6 | 188 | 300 | 483 |
| 1:1 BOTTOM RT | 2.6 | 1.5 | 3.3 | 0.9 | 0.7 | 3.8 | 2.8 | 165 | 300 | 115 |
| 1.25:1 TOP RT | 3.3 | 1.6 | 5.2 | 1.4 | 1.4 | 6.2 | 5.7 | 174 | 375 | 519 |
| 1.25:1 BOTTOM RT | 2 | 1.2 | 2 | 0.6 | ND | 2.9 | 1.8 | 143 | 300 | 158 |
| 1.5:1 TOP RT | 2.9 | 1.5 | 4.7 | 1.2 | 1.4 | 5.2 | 4.8 | 158 | 450 | 596 |
| 1.5:1 BOTTOM RT | 1.8 | 1 | 1.5 | 0.2 | ND | 2.8 | 1.8 | 134 | 300 | 155 |
| 1:1 TOP COLD | 3.7 | 2 | 6.7 | 1.6 | 1.8 | 7.4 | 7.5 | 219 | 300 | 376 |
| 1:1 BOTTOM COLD | 1.8 | 1.2 | 1.5 | 0.5 | ND | 2.8 | 1.7 | 110 | 300 | 219 |
| 1.25:1 TOP COLD | 3.4 | 1.8 | 5.7 | 1.6 | 1.3 | 6.2 | 5.9 | 190 | 375 | 458 |
| 1.25:1 BOTTOM COLD | 1.7 | 1 | 1.2 | 0.3 | ND | 2.5 | 1.1 | 103 | 300 | 214 |
| 1.5:1 TOP COLD | 2.8 | 1.6 | 5 | 1.4 | 1.4 | 5.4 | 5 | 155 | 450 | 537 |
| 1.5:1 BOTTOM COLD | 1.4 | 0.9 | 1 | 0.2 | ND | 1.6 | 1.3 | 108 | 300 | 218 |
| JD 86 PROOF CONTROL | 7 | 3.5 | 9.6 | 3 | 2.6 | 12.2 | 11.6 | 363 | N/A | N/A |

-continued

| | 2 HOUR EXTRACTION | | | | | | | | | |
|---|---|---|---|---|---|---|---|---|---|---|
| SAMPLE | GALLIC ACID | HMF | FURFURAL | SYRINGIC ACID | VANILLIN | SYR. ALDEH. | ELL. ACID | TANNINS | START WT (g) | FIN. WT. |
| 2. WEIGHT YIELD (G) | | | | | | | | | | |
| 1:1 TOP RT | 0.0015456 | 0.23329 | 0.0026082 | 0.0007245 | 0.000676 | 0.0028014 | 0.0022218 | 0.090804 | | |
| 1:1 BOTTOM RT | 0.000299 | 0.01323 | 0.0003795 | 0.0001035 | 8.05E-05 | 0.000437 | 0.000322 | 0.018975 | | |
| 1.25:1 TOP RT | 0.0017127 | 0.26936 | 0.0026988 | 0.0007266 | 0.000727 | 0.0032178 | 0.0029583 | 0.090306 | | |
| 1.25:1 BOTTOM RT | 0.000316 | 0.02496 | 0.000316 | 0.0000948 | ND | 0.0004582 | 0.0002844 | 0.022594 | | |
| 1.5:1 TOP RT | 0.0017284 | 0.35522 | 0.0028012 | 0.0007152 | 0.000834 | 0.0030992 | 0.0028608 | 0.094168 | | |
| 1.5:1 BOTTOM RT | 0.000279 | 0.02403 | 0.0002325 | 0.000031 | ND | 0.000434 | 0.000279 | 0.02077 | | |
| 1:1 TOP COLD | 0.0013912 | 0.14138 | 0.0025192 | 0.0006016 | 0.000677 | 0.0027824 | 0.000282 | 0.082344 | | |
| 1:1 BOTTOM COLD | 0.0003942 | 0.04796 | 0.0003285 | 0.0001095 | ND | 0.0006132 | 0.0003723 | 0.02409 | | |
| 1.25:1 TOP COLD | 0.0015572 | 0.20976 | 0.0026106 | 0.0007328 | 0.000595 | 0.0028396 | 0.0027022 | 0.08702 | | |
| 1.25:1 BOTTOM COLD | 0.0003638 | 0.0458 | 0.0002568 | 0.0000642 | ND | 0.000535 | 0.0002354 | 0.022042 | | |
| 1.5:1 TOP COLD | 0.0015036 | 0.28837 | 0.002685 | 0.0007518 | 0.000752 | 0.0028998 | 0.0002685 | 0.083235 | | |
| 1.5:1 BOTTOM COLD | 0.0003052 | 0.04752 | 0.000218 | 0.0000436 | ND | 0.0003488 | 0.0002834 | 0.023544 | | |
| JD 86 PROOF CONTROL | 0.0021 | 0.0011 | 0.00288 | 0.0009 | 0.00078 | 0.00366 | 0.00348 | 0.1089 | | |
| 1. PPM | | | | | | | | | | |
| 1:1 TOP RT | 3.2 | 1.8 | 5.4 | 1.3 | 1.3 | 5.9 | 6.5 | 184 | 300 | 500 |
| 1:1 BOTTOM RT | 2.4 | 1.6 | 3.1 | 0.9 | 0.8 | 4.3 | 3.6 | 170 | 300 | 105 |
| 1.25:1 TOP RT | 3 | 1.7 | 5.3 | 1.4 | 1.3 | 5.6 | 6.4 | 160 | 375 | 535 |
| 1.25:1 BOTTOM RT | 2.2 | 1.2 | 2 | 0.5 | 0.2 | 2.7 | 2.8 | 152 | 300 | 145 |
| 1.5:1 TOP RT | 3.1 | 1.5 | 4.7 | 1.1 | 1.4 | 5.2 | 6.3 | 150 | 450 | 596 |
| 1.5:1 BOTTOM RT | 2.1 | 1 | 1.4 | 0.5 | 0.2 | 2.5 | 2.1 | 134 | 300 | 150 |
| 1:1 TOP COLD | 4 | 2.1 | 7 | 1.6 | 1.8 | 7.8 | 8.4 | 218 | 300 | 385 |
| 1:1 BOTTOM COLD | 1.7 | 1.1 | 1.2 | 0.5 | ND | 2.4 | 1.2 | 106 | 300 | 220 |
| 1.25:1 TOP COLD | 3.5 | 1.8 | 6 | 1.6 | 1.6 | 7 | 7.3 | 196 | 375 | 460 |
| 1.25:1 BOTTOM COLD | 1.4 | 1 | 0.9 | ND | ND | 1.6 | 1.2 | 113 | 300 | 215 |
| 1.5:1 TOP COLD | 2.1 | 1.8 | 5.6 | 1.9 | 1.8 | 5.7 | 4.7 | 170 | 450 | 535 |
| 1.5:1 BOTTOM COLD | 1.3 | 0.5 | 0.5 | 0.3 | ND | 2 | 4.3 | 95 | 300 | 210 |
| JD 82 PROOF CONTROL | 7 | 3.5 | 9.8 | 2.8 | 2.5 | 12.3 | 11.4 | 350 | N/A | N/A |
| 2. WEIGHT YIELD (G) | | | | | | | | | | |
| 1:1 TOP RT | 0.0015 | 0.0009 | 0.0027 | 0.00065 | 0.00065 | 0.00295 | 0.00325 | 0.092 | | |
| 1:1 BOTTOM RT | 0.000252 | 0.00017 | 0.000326 | 0.000095 | 0.000084 | 0.000452 | 0.00038 | 0.0179 | | |
| 1.25:1 TOP RT | 0.00161 | 0.00091 | 0.00284 | 0.00075 | 0.000696 | 0.003 | 0.00342 | 0.086 | | |
| 1.25:1 BOTTOM RT | 0.00032 | 0.00017 | 0.003 | 0.000073 | 0.00003 | 0.00039 | 0.00041 | 0.022 | | |
| 1.5:1 TOP RT | 0.0019 | 0.0009 | 0.0028 | 0.00066 | 0.000834 | 0.0031 | 0.00376 | 0.09 | | |
| 1.5:1 BOTTOM RT | 0.00032 | 0.00015 | 0.00021 | 0.000075 | 0.00003 | 0.0031 | 0.0032 | 0.02 | | |
| 1:1 TOP COLD | 0.00154 | 0.00081 | 0.0027 | 0.000062 | 0.00069 | 0.0031 | 0.00323 | 0.084 | | |
| 1:1 BOTTOM COLD | 0.00037 | 0.00024 | 0.00026 | 0.00011 | 0 | 0.00053 | 0.000264 | 0.023 | | |
| 1.25:1 TOP COLD | 0.0016 | 0.00083 | 0.00276 | 0.00074 | 0.00074 | 0.00322 | 0.0034 | 0.09 | | |
| 1.25:1 BOTTOM COLD | 0.000301 | 0.00022 | 0.000194 | 0 | 0 | 0.00034 | 0.00026 | 0.024 | | |
| 1.5:1 TOP COLD | 0.00112 | 0.00096 | 0.002996 | 0.001017 | 0.000963 | 0.00305 | 0.00251 | 0.091 | | |
| 1.5:1 BOTTOM COLD | 0.000273 | 0.00011 | 0.00011 | 0.000063 | ND | 0.00042 | 0.000903 | 0.01995 | | |
| JD 82 PROOF CONTROL | 0.0021 | 0.0011 | 0.00294 | 0.00084 | 0.00075 | 0.0037 | 0.00342 | 0.105 | | |

CONCLUSION:

The aforementioned experiments have provided basic information that may prove useful to extracting compounds from wood soak material and other mature oak aged alcoholic beverages.

The process and products of the present invention provide significant advantages. The extract produced by the process can be used to produce an alcoholic beverage for human consumption having substantially the same flavor characteristics as mature oak aged alcoholic beverage at a substantially reduced cost due to relatively low production costs and elimination of a substantial portion of transportation costs and excise taxes. The method of preparation of the extract is relatively simple and inexpensive and can be carried out with substantially standard equipment readily available in most industrialized countries.

The method of use of the extract is also relatively simple and can be carried out with substantially standard equipment and techniques.

Of course, it should be understood that a wide range of changes and modifications can be made to the preferred embodiments described above. It is, therefore, intended that the foregoing description be regarded as illustrative rather than limiting and that it be understood that it is the following claims, including all equivalents, which are intended to define the scope of this invention.

What is claimed is:

1. A process for producing an extract of an alcoholic beverage produced by an accelerated whisky maturation method, said process comprising:
   (i) adding a food grade solvent selected from the group consisting of ethyl acetate, hexane and one or more of isopentyl alcohol, active amyl alcohol, isobutyl alcohol, or normal propyl alcohol, to the alcoholic beverage produced by an accelerated whisky maturation method and mixing to produce a mixture of the solvent and the alcoholic beverage produced by an accelerated whisky maturation method;
   (ii) allowing a first layer comprising the food grade solvent to separate from a second layer;
   (iii) substantially separating the first layer from the second layer; and
   (iv) substantially removing the food grade solvent from the first layer to produce the extract.

2. A process of claim 1, wherein the food grade solvent is selected from the group consisting of ethyl acetate and one or more of isopentyl alcohol, active amyl alcohol, isobutyl alcohol, or normal propyl alcohol.

3. A process for producing an extract of an alcoholic beverage produced by an accelerated whisky maturation method, the process comprising:
   (i) combining an alcoholic distillate with toasted oak chips to provide a mixture of the alcoholic distillate and the toasted oak chips;
   (ii) heating and aerating or oxygenating the mixture for about 5–about 40 days to obtain the alcoholic beverage produced by the accelerated whisky maturation method;
   (iii) adding ethyl acetate to the alcoholic beverage produced by the accelerated whisky maturation method and mixing to produce a mixture of ethyl acetate and the alcoholic beverage produced by the accelerated whisky maturation method;
   (iv) allowing a first layer comprising ethyl acetate to separate from a second layer;
   (v) substantially separating the first layer from the second layer; and
   (vi) substantially removing ethyl acetate from the first layer to produce the extract.

4. A process for producing an extract of an alcoholic beverage produced by an accelerated whisky maturation method, said process comprising:
   (i) adding ethyl acetate to the alcoholic beverage produced by an accelerated whisky maturation method and mixing to produce a mixture of ethyl acetate and the alcoholic beverage produced by an accelerated whisky maturation method;
   (ii) allowing a first layer comprising ethyl acetate to separate from a second layer;
   (iii) substantially separating the first layer from the second layer; and
   (iv) substantially removing ethyl acetate from the first layer to produce the extract.

5. A process of claim 3, wherein ethyl acetate is substantially removed from the first layer by evaporation under vacuum at 60° C.

6. A process of claim 4, wherein ethyl acetate is substantially removed from the first layer by evaporation under vacuum at 60° C.

7. A process according to claim 3, wherein the alcoholic beverage produced by an accelerated whisky maturation method is selected from the group consisting of bourbon, scotch, whisky, rum, and tequila.

8. A process according to claim 7, wherein the alcoholic beverage produced by an accelerated whisky maturation method is whisky.

9. A process according to claim 4, wherein the alcoholic beverage produced by an accelerated whisky maturation method is selected from the group consisting of bourbon, scotch, whisky, rum, and tequila.

10. A process according to claim 9, wherein the wherein the alcoholic beverage produced by an accelerated whisky maturation method is whisky.

11. A process for producing an alcoholic beverage for human consumption comprising:
   (i) combining an alcoholic distillate with toasted oak chips to provide a mixture of the alcoholic distillate and the toasted oak chips;
   (ii) heating and aerating or oxygenating the mixture for about 5–about 40 days to obtain an alcoholic beverage produced by an accelerated whisky maturation method,
   (iii) adding ethyl acetate to the alcoholic beverage produced by the accelerated whisky maturation method and mixing to produce a mixture of ethyl acetate and the alcoholic beverage produced by the accelerated whisky maturation method;
   (iv) allowing a first layer comprising ethyl acetate to separate from a second layer;
   (v) substantially separating the first layer from the second layer;
   (vi) substantially removing ethyl acetate from the first layer to produce an extract of the beverage produced by the accelerated whisky maturation method; and
   (vii) adding the extract to at least one less costly alcoholic beverage selected from the group consisting of grain neutral spirits, sugar beet spirits and sugar cane spirits to produce the alcoholic beverage for human consumption.

12. A process according to claim 11, wherein the alcoholic distillate is whisky distillate.

13. A process for producing an alcoholic beverage for human consumption comprising:
   (i) adding ethyl acetate to an alcoholic beverage produced by an accelerated whisky maturation method and mixing to produce a mixture of ethyl acetate and the alcoholic beverage produced by the accelerated whisky maturation method;
   (ii) allowing a first layer comprising ethyl acetate to separate from a second layer;
   (iii) substantially separating the first layer from the second layer;
   (iv) substantially removing ethyl acetate from the first layer to produce an extract of the beverage produced by the accelerated whisky maturation method; and
   (v) adding the extract to at least one less costly alcoholic beverage selected from the group consisting of grain neutral spirits, sugar beet spirits and sugar cane spirits to produce the alcoholic beverage for human consumption.

14. A process according to claim 13, wherein the alcoholic beverage produced by an accelerated whisky maturation method is selected from the group consisting of bourbon, scotch, whisky, rum, and tequila.

15. A process according to claim 14, wherein the alcoholic beverage produced by an accelerated whisky maturation method is whisky.

16. A process of producing an alcoholic beverage for human consumption comprising:
   (i) adding a food grade solvent selected from the group consisting of ethyl acetate, hexane and one or more of isopentyl alcohol, active amyl alcohol, isobutyl alcohol, or normal propyl alcohol, to an alcoholic beverage produced by an accelerated whisky maturation method and mixing to produce a mixture of the solvent and the alcoholic beverage produced by an accelerated whisky maturation method;
   (ii) allowing a first layer comprising the food grade solvent to separate from a second layer;
   (iii) substantially separating the first layer from the second layer;
   (iv) substantially removing the food grade solvent from the first layer to produce an extract; and
   (v) adding the extract to at least one less costly alcoholic beverage selected from the group consisting of grain neutral spirits, sugar beet spirits and sugar cane spirits to produce the alcoholic beverage for human consumption.

17. A process according to claim 16, wherein the alcoholic beverage produced by an accelerated whisky maturation method is selected from the group consisting of bourbon, scotch, whisky, rum, and tequila.

18. A process according to claim 16, wherein the alcoholic beverage produced by an accelerated whisky maturation method is whisky.

19. A process according to claim 16, wherein the food grade solvent is selected from the group consisting of ethyl acetate and one or more of isopentyl alcohol, active amyl alcohol, isobutyl alcohol, or normal propyl alcohol.

* * * * *